United States Patent [19]

Stewart et al.

[11] Patent Number: 5,340,178
[45] Date of Patent: Aug. 23, 1994

[54] VEHICLE BUMPER BEAM

[75] Inventors: Robert L. Stewart, Rochester Hills; Alan J. Osterman, Bloomfield Hills; Dennis W. Jalbert, Mt. Clemens; John D. Nulty, South Lyon, all of Mich.

[73] Assignee: Chrysler Corporation, Highland Park, Mich.

[21] Appl. No.: 150,316

[22] Filed: Nov. 12, 1993

[51] Int. Cl.⁵ .................................................. B60R 19/02
[52] U.S. Cl. ....................................... 293/122; 293/132
[58] Field of Search .................. 293/120, 122, 132; 52/734

[56] References Cited

U.S. PATENT DOCUMENTS

| | | | |
|---|---|---|---|
| 955,624 | 4/1910 | Welton | 293/122 |
| 1,647,627 | 11/1927 | Horowitz | 293/120 |
| 3,814,470 | 6/1974 | Kicher et al. | 293/70 |
| 3,827,740 | 8/1974 | Golze et al. | 293/98 |
| 3,843,182 | 10/1974 | Walls et al. | 293/88 |
| 3,897,095 | 7/1975 | Glance et al. | 293/120 |
| 4,465,312 | 8/1984 | Werner | 293/132 |
| 4,925,224 | 5/1990 | Smiszek | 293/120 |
| 5,080,410 | 1/1992 | Stewart et al. | 293/102 |
| 5,201,912 | 4/1993 | Terada et al. | 293/120 |

FOREIGN PATENT DOCUMENTS

| | | | |
|---|---|---|---|
| 1289441 | 2/1969 | Fed. Rep. of Germany | 293/120 |
| 230847 | 10/1987 | Japan | 293/122 |
| 1652133 | 5/1991 | U.S.S.R. | 293/132 |

*Primary Examiner*—Joseph D. Pape
*Attorney, Agent, or Firm*—Edward A. Craig

[57] ABSTRACT

An elongated tubular bumper beam for an automotive vehicle is of box-like cross-section. The bumper beam has upper and lower walls connected by outer and inner walls. A reinforcing web of generally S-shaped configuration interconnects the outer and inner walls. The bumper beam is preferably made of a lightweight material such as aluminum, magnesium or plastic.

1 Claim, 1 Drawing Sheet

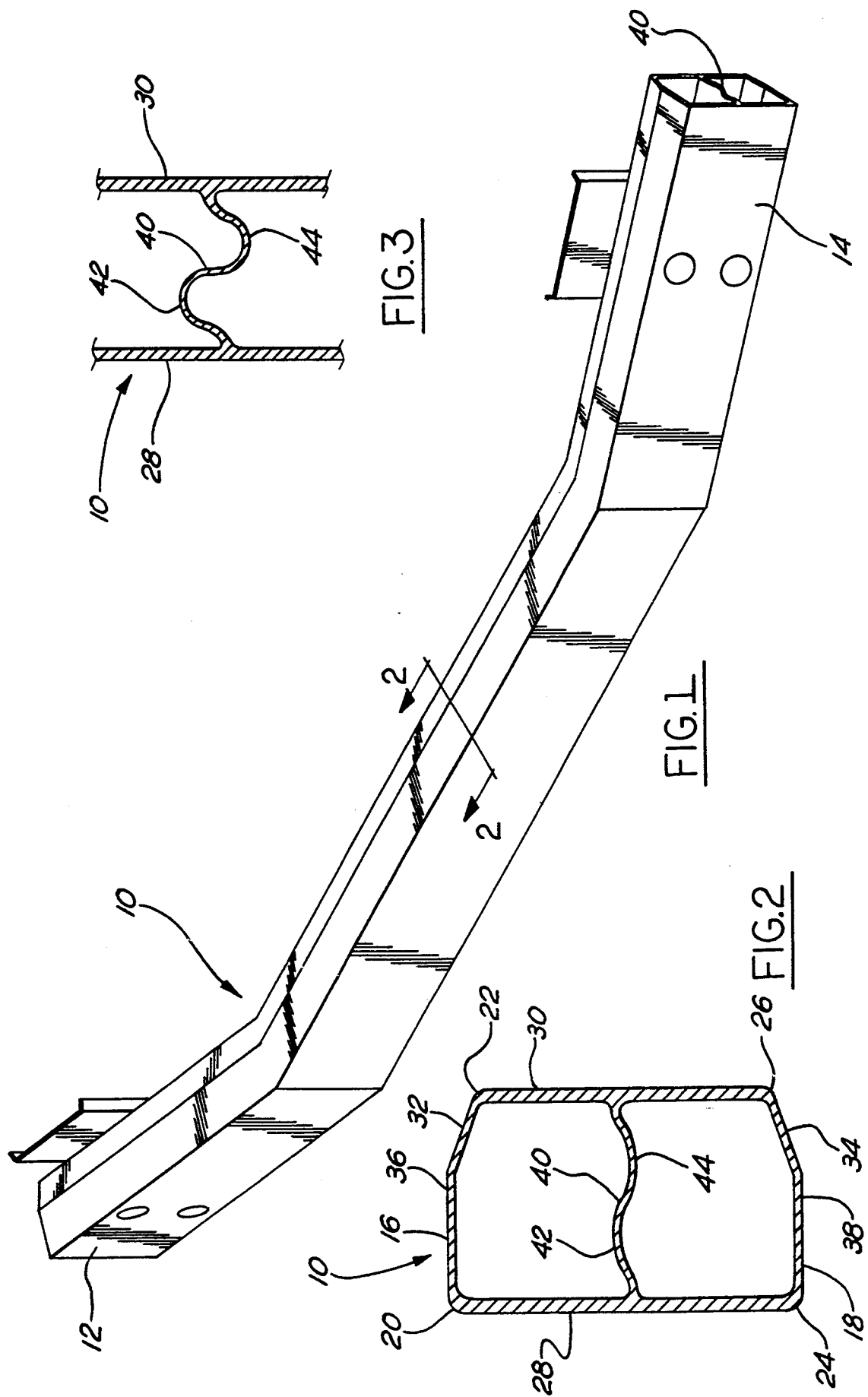

VEHICLE BUMPER BEAM

This invention relates to a tubular vehicle bumper beam preferably fabricated of lightweight materials.

BACKGROUND AND SUMMARY

Common practice is to form bumper beams for vehicles, particularly cars, of a high strength steel.

The bumper beam of this invention is preferably formed of a lighter weight material such as aluminum, plastic or magnesium. The bumper beam has a tubular cross-section so as to be still lighter in weight, and lower in cost.

The lightweight materials used in the fabrication of the beam are relatively weak structurally, as compared with high strength steel. Therefore, a reinforcement is provided internally of the hollow beam. The provision of reinforcement permits the walls of the beam to be relatively thin. Thinner walls are advantageous in further reducing the weight of the bumper beam.

The bumper beam must be able to withstand low speed impacts without collapsing. The reinforcement, preferably in the form of an S-shaped web, accomplishes this. However, the bumper beam must be capable of collapsing evenly upon a high speed impact. This results in absorbing energy of an accident and improves vehicle safety. The S-shape of the web results in the desired even collapsing of the bumper beam.

An object of this invention is to provide a bumper beam having the foregoing features.

Other objects are to provide a bumper beam which is rugged and durable in use, and capable of being easily and inexpensively manufactured.

Other objects, features and advantages of the invention will become more apparent as the following description proceeds, especially when considered in conjunction with the accompanying drawings.

BRIEF DESCRIPTION OF THE DRAWINGS

FIG. 1 is a perspective view of a hollow bumper beam constructed in accordance with the invention.

FIG. 2 is a sectional view taken on the line 2—2 in FIG. 1.

FIG. 3 is a view similar to a portion of FIG. 2 but showing the bumper partially collapsed after withstanding an impact.

DETAILED DESCRIPTION

Referring now more particularly to the drawings, the bumper beam 10 is an elongated structure adapted to be secured to the front end of an automobile and is dimensioned to extend substantially from side-to-side thereof. The bumper beam may be curved or have its end portions 12 and 14 bent rearwardly as shown. A plastic ornamental fascia (not shown) may be secured over the bumper beam.

The bumper beam 10 is curved or bent as shown for several reasons. Firstly, the space behind the central portion of the bumper beam permits deflection of the bumper beam in the event of impact with another car without damaging structure behind the bumper beam. Secondly, this configuration of the bumper beam provides room behind the bumper beam for vehicle components such as the radiator. Finally, this configuration of the bumper beam is desirable for esthetic reasons.

FIG. 2 illustrates the cross-sectional configuration of the bumper beam. It will be noted that the bumper beam 10 is tubular and has a box-like configuration which results in higher strength and dimensional stability.

The bumper beam 10 has an upper wall 16 and a lower wall 18. The upper wall 16 has an outer edge 20 and an inner edge 22. The lower wall 18 has an outer edge 24 and an inner edge 26. An outer wall 28 interconnects the outer edges 20 and 24, respectively, of the upper and lower walls. An inner wall 30 interconnects the inner edges 22 and 26, respectively, of the upper and lower walls. The outer wall 28 faces away from the vehicle, facing forwardly in the case of a front bumper and rearwardly in the case of a rear bumper.

An inner portion 32 of the upper wall 16 is angled downwardly into integral connection with inner wall 30. An inner portion 34 of the lower wall 18 is angled upwardly into integral connection with the inner wall 30. The inner portions 32 and 34 of the upper and lower walls are substantially equal in width preferably extending from about the mid-point of the upper and lower walls 16 and 18, respectively. The downward angle of the inner portion 32 of the upper wall 16 is substantially the same number of degrees as the upward angle of the inner portion 34 of the lower wall 18, although of reverse direction. This angulation of the inner portions of the upper and lower walls results in the inner wall 30 being narrower, that is of less height, than the outer wall 28 as can be seen in FIG. 2. The outer and inner walls 28 and 30 are substantially vertically oriented when the bumper beam is mounted on the vehicle. A substantially horizontally oriented portion 36 of the upper wall 16 extends between the downwardly angled inner portion 32 of the upper wall and the upper edge of the outer wall 28. A substantially horizontally oriented portion 38 of the lower wall 18 extends between the upwardly angled inner portion 34 of the lower wall 18 and the lower edge of the outer wall 28.

The angulation of the inner portions of the upper and lower walls has several advantages. Firstly, it minimizes distortion of the box-like cross section when bent at an angle or sweep as shown in FIG. 1. Secondly, it minimizes air flow disturbance in front of the air conditioning condenser and radiator. In addition, it is a weight saving feature because it requires less material to form as compared to a rectangular cross-section.

The box-like configuration in cross-section of the bumper beam increases the strength of the bumper beam and provides dimensional stability. Increased strength permits absorption of energy with consequent reduction in distortion of the bumper beam when it is impacted.

In order to further strengthen the bumper beam, a reinforcement means is provided in the hollow interior of the bumper beam. This reinforcement means takes the form of an integral web 40 which extends for the full length of the bumper beam. The web has its outer edge integrally connected to the outer wall 28 of the bumper beam about mid-way of the height of the outer wall, and has its inner edge integrally connected to the inner wall 30 of the bumper beam at about the mid-point in the height of the inner wall. The web is preferably formed to an S-shape, as seen in the vertical section of FIG. 2, so that for one half of its width it is arched upwardly. The other half is arched downwardly. The two halves 42 and 44 are arched in a smooth, continuous arcuate formation. This S-shaped configuration is preferably uniform throughout the full length of the web.

FIG. 3 shows the cross-section of the bumper beam after impact and it will be observed that the outer wall 28 has been pushed inwardly towards the inner wall 30 and the web 40 is compressed to exaggerate its S-shaped configuration. The web thus reinforces the bumper beam and contributes to the absorption of energy as the bumper beam collapses.

The bumper beam is preferably fabricated of a relatively lightweight material such as aluminum, magnesium or plastic. Having less strength than steel from which many bumper beams in the past have been fabricated, the strengthening box-like configuration and the reinforcing web compensate for the relatively weaker materials employed. The structurally reinforcing web 40 also permits the bumper beam walls to be made relatively thin. Thinner walls are advantageous in reducing the overall weight of the bumper beam.

The bumper beam must be able to withstand low speed impacts without collapsing. The provision of the reinforcing web accomplishes this objective. The bumper beam must be capable of collapsing evenly upon a high speed impact. This results in absorbing energy of an accident and improves vehicle safety. The S-shape of the web results in the desired even collapsing of the bumper beam.

Before being formed to a curved or bent configuration, the beam is in the shape of a straight tubular section, preferably seamless tubing, and may be extruded in a conventional manner.

What is claimed is:

1. An elongated tubular vehicle bumper beam, the bumper beam having a cross-sectional configuration comprising an upper wall and a lower wall, each of the upper wall and lower wall having an outer edge and an inner edge, an outer wall interconnecting the outer edges of the upper and lower walls, and an inner wall interconnecting the inner edges of the upper and lower walls, an inner portion of the upper wall being angled downwardly into connection with the inner wall and an inner portion of the lower wall being angled upwardly into connection with the inner wall, said upper wall having a substantially horizontally oriented portion extending between said downwardly angled inner portion and the outer wall, and said lower wall having a substantially horizontally oriented portion extending between said upwardly angled inner portion and the outer wall, the inner wall being of less height than the outer wall, and reinforcement means interconnecting said outer and inner walls to resist collapse of said bumper beam when the outer wall is subject to impact, said reinforcement means comprising an elongated web extending the full length of said bumper beam, said web having an outer edge integrally connected to said outer wall midway of the height of said outer wall, said web having an inner edge integrally connected to said inner wall midway of the height of said inner wall, said web throughout its length being S-shaped in section taken transversely of said bumper beam such that for one half of its width said web is arched upwardly and for the other half of its width said web is arched downwardly in a smooth continuous arcuate formation, said bumper beam being formed of a lightweight material selected from the group consisting of aluminum, magnesium and plastic.

* * * * *